(12) United States Patent
Doshi et al.

(10) Patent No.: US 7,653,911 B2
(45) Date of Patent: Jan. 26, 2010

(54) IMPLICIT INTERPROCESS COMMUNICATIONS (IPC) VERSIONING SUPPORT

(75) Inventors: Sanjiv Doshi, San Jose, CA (US); Prashanth Ishwar, Santa Clara, CA (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 828 days.

(21) Appl. No.: 10/934,679

(22) Filed: Sep. 3, 2004

(65) Prior Publication Data

US 2005/0155040 A1 Jul. 14, 2005

Related U.S. Application Data

(60) Provisional application No. 60/500,625, filed on Sep. 5, 2003.

(51) Int. Cl.
*G06F 9/44* (2006.01)
(52) U.S. Cl. .................. 719/313; 719/328; 717/170
(58) Field of Classification Search ......... 719/310–313, 719/315, 328; 709/203, 208, 217–220, 229, 709/230; 717/170
See application file for complete search history.

(56) References Cited

U.S. PATENT DOCUMENTS

| | | | |
|---|---|---|---|
| 5,546,584 A * | 8/1996 | Lundin et al. ............... 719/315 |
| 5,644,719 A | 7/1997 | Aridas et al. | |
| 5,805,670 A * | 9/1998 | Pons et al. ...................... 379/45 |
| 5,926,636 A * | 7/1999 | Lam et al. .................... 719/313 |
| 6,463,078 B1 * | 10/2002 | Engstrom et al. ........... 370/466 |
| 6,587,890 B1 * | 7/2003 | Kult et al. .................... 719/328 |
| 6,601,111 B1 | 7/2003 | Peacock et al. | |
| 6,829,769 B2 * | 12/2004 | Cranston et al. ............. 719/312 |
| 6,912,522 B2 * | 6/2005 | Edgar ............................. 707/2 |
| 7,010,607 B1 * | 3/2006 | Bunton ....................... 709/228 |
| 7,107,329 B1 * | 9/2006 | Schroder et al. ............. 709/221 |
| 7,162,476 B1 * | 1/2007 | Belair et al. .................. 707/10 |
| 7,228,539 B2 * | 6/2007 | Zhang et al. ................. 717/171 |
| 2002/0107903 A1 * | 8/2002 | Richter et al. ............... 709/201 |
| 2004/0039827 A1 * | 2/2004 | Thomas et al. .............. 709/228 |
| 2005/0027785 A1 * | 2/2005 | Bozak et al. ................. 709/200 |
| 2005/0128956 A1 * | 6/2005 | Hsu et al. .................... 370/252 |
| 2006/0023676 A1 * | 2/2006 | Whitmore et al. ........... 370/338 |

* cited by examiner

*Primary Examiner*—Van H Nguyen
(74) *Attorney, Agent, or Firm*—Wilson & Ham

(57) ABSTRACT

Compatibility between applications in a network node with a distributed architecture is maintained after application upgrades by associating version compatibility information with interprocess communications (IPC) message structures and then utilizing the version compatibility information to identify IPC message structures that are used for communications between applications. Once the version compatibility information is associated with the IPC message structures, applications are configured to use only those IPC message structures that are compatible with the currently running version.

24 Claims, 7 Drawing Sheets

| IPC Protocol Info. | | |
| --- | --- | --- |
| IPC Message Name | IPC Message Structure | Version Compatibility Info. |
| msg1 | struct MLt_msg1_msg<br>structure 1<br>structure 2 | 1,2,3 |
| msg2 | struct MLt_msg2_msg<br>structure 3<br>structure 4 | 1-2 |
| msg3 | struct MLt_msg3_msg<br>structure 5<br>structure 6 | 1,3 |
| msg4 | struct MLt_msg4_msg<br>structure 7<br>structure 8 | 1,3 |
|  | struct MLt_msg4_v2_msg<br>structure 9<br>structure 10 | 2 |
| msg5 | struct MLt_msg5_msg<br>structure 11<br>structure 12 | 3 |

FIG.4

```
/*
struct ML_version_t mlv_msg_version [ ] = {
    { 1, 0 },
      { 2, 0 },
      { 3, 0 },
};
*/ enum MLm_messages {
        MLm_msg1_msg = 1,       //% MLt_msg1_msg
        MLm_msg2_msg = 2,       //% 1-2:MLt_msg2_msg
        MLm_msg3_msg = 3,       //% 1,3:MLt_msg3_msg
        MLm_msg4_msg = 4,       //% 1,3:MLt_msg4_msg
                                //% 2:MLt_msg4_v2_msg
        MLm_msg5_msg = 5,       //% 3:MLt_msg5_msg
};

struct MLt_msg1_msg {
    . . . . .
}
struct MLt_msg2_msg {
    . . . . .
}
struct MLt_msg3_msg {
    . . . . .
}
struct MLt_msg4_msg {
    . . . . .
}
struct MLt_msg4_v2_msg {
    . . . . .
}
struct MLt_msg5_msg {
    . . . . .
}
```

FIG.6

IMPLICIT INTERPROCESS COMMUNICATIONS (IPC) VERSIONING SUPPORT

CROSS REFERENCE TO RELATED APPLICATIONS

This application is entitled to the benefit of provisional U.S. Patent Application Ser. No. 60/500,625, filed 5 Sep. 2003.

FIELD OF THE INVENTION

The invention relates generally to packet-based communications networks, and more particularly, to managing applications in a network node that utilizes a distributed architecture.

BACKGROUND OF THE INVENTION

The demand on packet-based communications networks continues to grow. In order to provide better performance, many network nodes such as routers and switches have been designed with distributed architectures that include an integration of independent computer systems that are optimized to perform specific tasks. For example, a chassis-based router or switch may include a control module card that provides central control functions and multiple port interface cards that provide the interface to other network nodes. The control module and port interfaces are each independent computer systems that have their own central processing unit (CPU), operating system, and software applications. The software applications that are supported by the respective CPUs "reside on" the respective independent computer systems and include applications such as Layer 2 (L2) management, Layer 3 (L3) management, link aggregation control protocol (LACP), spanning tree protocol (STP), multiprotocol label switching (MPLS), etc. The applications that reside on the independent computer systems of the network node are themselves independent applications that can operate independently of other applications. That is, the applications operate independently of other applications that reside on the same independent computer system and independently of other applications that reside on different independent computer systems.

Although each application is a stand-alone application that can operate independently of other applications, many applications that reside on different independent computer systems of a network node rely on each other for information. For example, L3 management applications residing on the control module and the port interfaces exchange routing information that is used to learn routes and mange routing tables. Network nodes with distributed architectures use an interprocess communications (IPC) protocol to communicate between applications that reside on the different independent computer systems. For example, these network nodes often use a message-type IPC protocol that relies on formatted messages to exchange information between applications. For a message-type IPC protocol to be successful, it is necessary that the applications use IPC message structures that are compatible with the active versions of an application.

In network nodes with distributed architectures, there may be situations when it is desirable to upgrade an application that resides on one of the independent computer systems without upgrading the corresponding applications that reside on the other independent computer systems. However, in most network nodes with a distributed architecture, application upgrades are an "all or nothing" proposition. That is, to maintain the compatibility between corresponding applications that reside on the different independent computer systems of a network node, all instances of the application must be upgraded together to maintain compatibility and prevent any of the applications from crashing due to incompatibilities between the application versions. For example, upgrading the L3 management task that resides on one port interface triggers a need to upgrade the corresponding application that resides on the control module, which in turn triggers a need to upgrade the corresponding application that resides on the other port interfaces. Because of the domino effect that is triggered by a single application upgrade, it is difficult to implement an application upgrade on one of the independent computer systems without experiencing some network down time.

One technique that has been used to avoid network down time as a result of application upgrades involves providing complete redundancy for each of the independent computer systems. Complete redundancy for each of the independent computer systems allows application upgrades to be performed in the background on all of the redundant systems. Once an application upgrade is complete on all of the redundant systems, the redundant systems, which include the upgraded applications, are placed into service as the primary systems. Although complete redundancy enables application upgrades to be achieved without incurring network down time, providing complete redundancy is costly and does not provide much flexibility.

In view of this, what is needed is a technique for managing applications in a network node with a distributed architecture that avoids down time and that provides flexibility with application upgrades.

SUMMARY OF THE INVENTION

Compatibility between applications in a network node with a distributed architecture is maintained after application upgrades by associating version compatibility information with IPC message structures and then utilizing the version compatibility information to identify IPC message structures that are used for communications between applications. Once the version compatibility information is associated with the IPC message structures, applications are configured to use only those IPC message structures that are compatible with the currently running version. Using version compatibility information to identify compatible IPC message structures allows different versions of corresponding applications to run on the different independent computer systems of a network node with full backwards compatibility. Full backwards compatibility provides the flexibility to upgrade an application on one independent computer system of a network node without requiring an upgrade of corresponding applications on the other independent computer systems of the network node.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4 illustrates IPC protocol information that includes an association between version compatibility information and IPC message structures in accordance with an embodiment of the invention.

FIG. 6 depicts pseudo-code of an example protocol header file in accordance with an embodiment of the invention.

Throughout the description, similar reference numbers may be used to identify similar elements.

DETAILED DESCRIPTION OF THE INVENTION

Compatibility between applications in a network node with a distributed architecture is maintained after application upgrades by associating version compatibility information with interprocess communications (IPC) message structures and then utilizing the version compatibility information to identify IPC message structures that are used for communications between applications. Once the version compatibility information is associated with the IPC message structures, applications are configured to use only those IPC message structures that are compatible with the currently running version.

Figure 1:
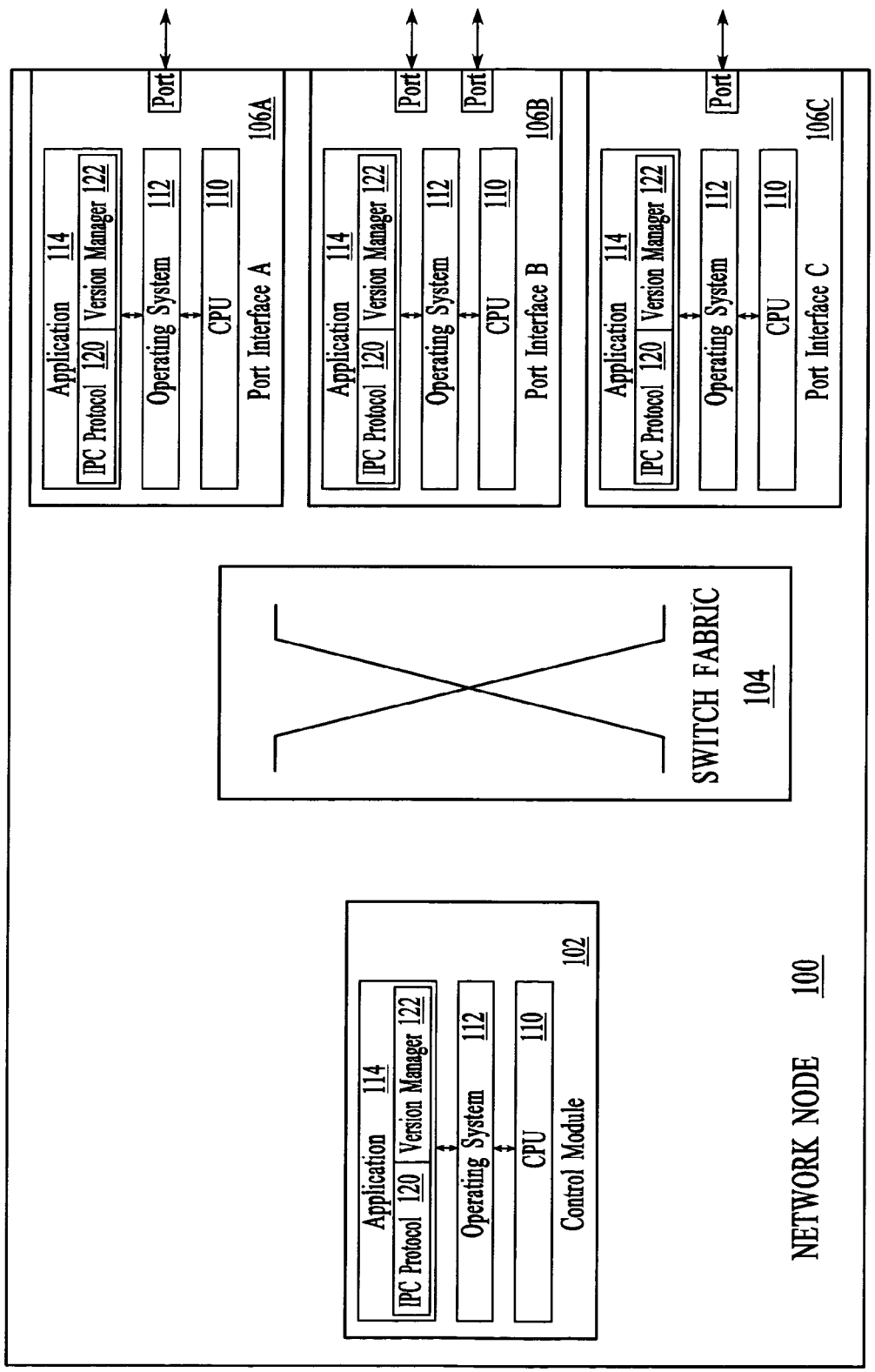
FIG. 1 depicts an embodiment of a network node with a distributed architecture and an implicit IPC-based version manager in accordance with an embodiment of the invention.

FIG. 1 depicts an embodiment of a network node 100 with a distributed architecture that is configured to support implicit IPC-based version management. The network node includes a control module 102, a switch fabric 104, and three port interfaces 106A, 106B, and 106C (port interfaces A, B, and C). The network node handles traffic in discrete segments, often referred to as datagrams. In an embodiment, the network node is an Ethernet switch/router that forwards traffic within the network node using Layer 2 (L2), Layer 3 (L3), and/or Layer 4 (L4) header information, where the network "Layers" are described in the Open System Interconnection (OSI) model as defined by the International Standardization Organization (ISO). The network node may include port interfaces that support other network protocols such as ATM, SONET, and Frame Relay. Although an Ethernet-based switch/router is described, the disclosed application management techniques can be applied to any network node that utilizes a distributed architecture.

Referring to FIG. 1, the control module 102 of the network node 100 supports various functions such as network management functions and protocol implementation functions. Example functions that are performed by the control module include implementing configuration commands, providing timing control, programming hardware tables, providing system information, supporting a user interface, managing hardware changes, and bus management. The switch fabric 104 provides datapaths between the control module and the port interfaces (e.g., control module to port interface datapaths and port interface to port interface datapaths). The switch fabric may include, for example, shared memory, shared bus, and crosspoint matrices. The port interfaces 106 perform functions such as receiving traffic into the network node, buffering traffic, making forwarding decisions, and transmitting traffic from the network node. The port interfaces include one or more ports that support connections to other network nodes.

The control module 102 and the port interfaces 106 are independent computer systems that include their own central processing unit (CPU) 110, operating system 112, and at least one application 114. The CPU within each independent computer system may include a multifunction processor and/or an application-specific processor. Examples of processors include the PowerPC™ family of processors by IBM and the x86 family of processors by Intel. The operating system provides a bridge between the CPU and the applications. Examples of operating systems that are used in network nodes with distributed architectures include NetBSD, Linux, and vxWORKS. Although not shown, the CPUs and operating systems may be supported by other hardware (e.g., memory and application-specific integrated circuits (ASICs)).

The applications 114 that reside on the independent computer systems are software-based applications that perform the various tasks required of a network node. Example applications that reside on the independent computer systems of a network node include, but are not limited to, L2 protocols, such as L2 Learning, virtual local area network (VLAN) management, spanning tree protocol (STP), and link aggregation control protocol (LACP) and L3 protocols such as open shortest path first (OSPF), border gateway protocol (BGP), intermediate system-to-intermediate system (ISIS), and multiprotocol label switching (MPLS). Although the CPUs 110, operating systems 112, and applications are depicted in FIG. 1 as separate functional units for description purposes, these functional units are operatively and functionally integrated as is known in the field. Additionally, although some examples of CPUs, operating systems, and applications are provided, these examples in no way are meant to be exhaustive lists.

Figure 2:
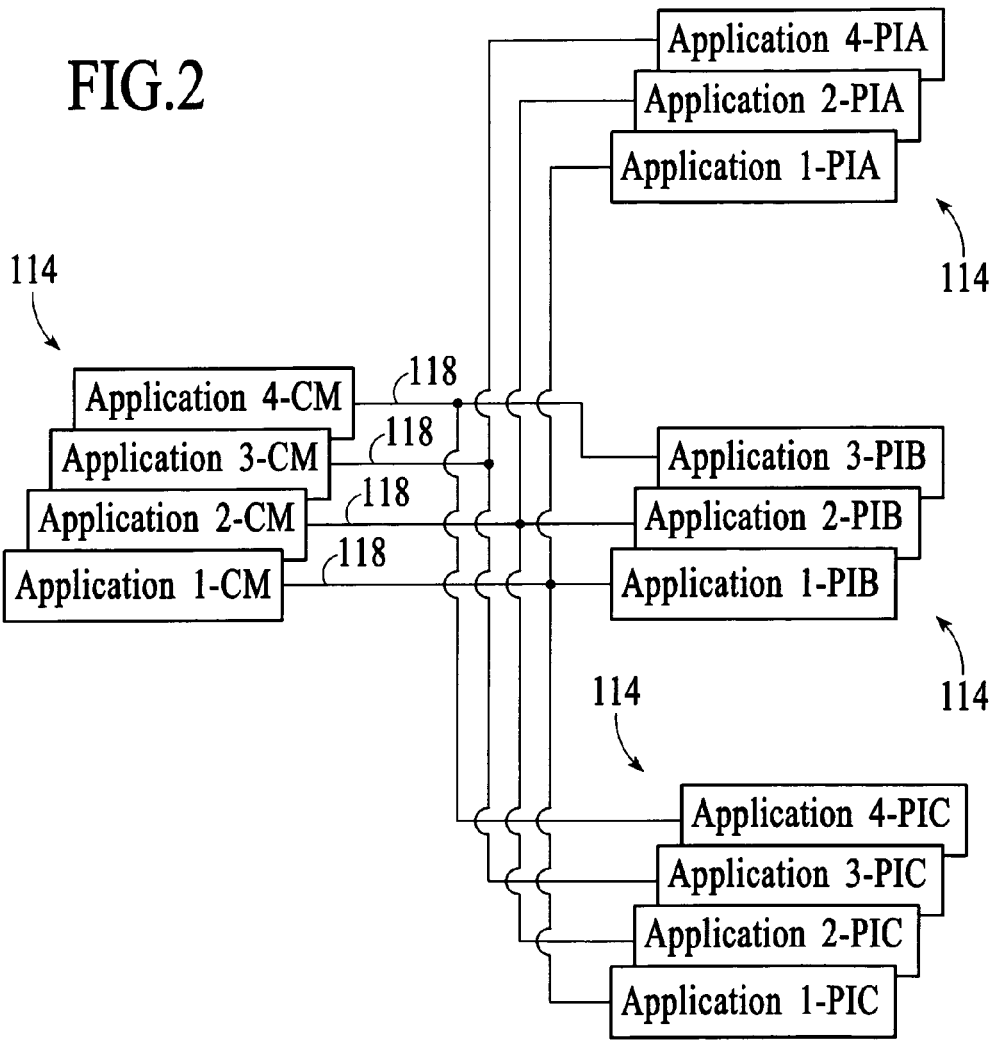
FIG. 2 depicts different corresponding applications that reside on the control module and the port interfaces of the network node of FIG. 1.

In a network node with a distributed architecture, some of the applications residing on one of the independent computer systems have corresponding applications that reside on the other independent computer systems. For example, the control module 102 of FIG. 1 may have an L3 management application that performs L3 tasks specific to the control module while the port interfaces have corresponding L3 management applications that perform L3 tasks that are specific to the port interfaces. FIG. 2 depicts different corresponding applications 114 (e.g., applications 1, 2, 3, and 4) that reside on the control module 102 and the port interfaces 106. In the example of FIG. 2, an application that resides on the control module is designated as "application X-CM" and an application that resides on one of the port interfaces is designated as "application X-PIA", "application X-PIB", or "application X-PIC" depending on the port interface. Note that every application does not necessarily exist at every independent computer system. In a distributed environment, the corresponding applications need to communicate with each other to successfully perform their respective tasks. FIG. 2 also depicts functional connections 118 that link corresponding applications to each other. As depicted in FIG. 2, the instances of application 1 are linked to each other, the instances of application 2 are linked to each other, and so on.

Figure 3:
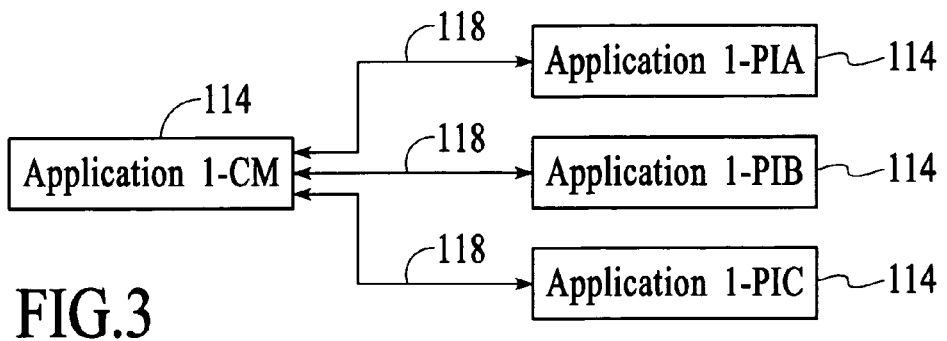
FIG. 3 illustrates socket-based connections between corresponding applications that reside on the control module and on the port interfaces of the network node of FIG. 1.

In an embodiment, corresponding applications 114 communicate with each other through socket-based connections, which are point-to-point connections between two applications. Communications between applications typically take place between an application that resides on the control module 102 and the applications that reside on the port interfaces 106, with the application residing on the control module acting as the central manager and distributor of information. FIG. 3 illustrates socket-based connections 118 between corresponding applications 114 (e.g., application 1) that reside on the control module and on the port interfaces. In the example of FIG. 3, information is exchanged directly between the application that resides on the control module and the applications that reside on the port interfaces but not directly between applications that reside on the port interfaces. Note that information could be exchanged directly between applications that reside on two different port interfaces by establishing a socket-based connection between the applications.

In order for a network node with a distributed architecture to function properly, applications residing on different independent computer systems must communicate with each other. For example, the L3 management application that resides on the control module needs to distribute learned Internet Protocol (IP) routing information to L3 management applications that reside on the port interfaces. The applications communicate between each other using an IPC protocol that is part of the respective applications. FIG. 1 depicts a software-based IPC protocol 120 that exists within the applications 114 of each independent computer system. In network nodes with distributed architectures, the IPC protocol typically involves communicating information in messages (often referred to as a "message-type IPC"). The messages carry data that is formatted according to IPC message structures that are known by both the sending and receiving applications.

For a message-type IPC protocol to work effectively, both applications must recognize the same set of IPC message structures. That is, both applications must be able to interpret the same message formats. If an application that resides on one of the independent computer systems is upgraded, the upgrade may add, delete, or change the IPC message structures that are defined by the IPC protocol. The additions, deletions, or changes in the IPC message structures of an application that resides on one of the independent computer systems, may make the application unable to communicate with a corresponding application, which has not been upgraded and resides on another of the independent computer systems. Incompatibility between corresponding applications will negatively impact application performance and possibly cause one or both of the applications to crash.

In accordance with the invention, the compatibility between applications in a network node with a distributed architecture is maintained in spite of application upgrades by associating version compatibility information with IPC message structures and then utilizing the version compatibility information to identify IPC message structures that are used for communications between applications. For example, FIG. 4 illustrates IPC protocol information that includes an association between version compatibility information and IPC message structures. In the example of FIG. 4, the IPC message structures are also identified by IPC message names. For example purposes, the IPC message structures are identified as being compatible with one or more of three different versions of an application (e.g., versions 1, 2, and 3). Version compatibility can be identified, for example, by identifying individual versions, version ranges, or "all" versions. In an embodiment, compatibility with all versions can be identified by not designating any versions. That is, leaving the designated version compatibility field blank indicates that the IPC message structure is compatible with all versions of an application. As shown in FIG. 4, msg1 is compatible with all versions, msg2 is compatible with the range of versions from 1-2, msg3 is compatible with versions 1 and 3, and msg5 is compatible with version 3. In addition, msg 4 has two different IPC message structures depending on which version of the application is active. In particular, the IPC message structure "struct_msg4" is used with versions 1 and 3 of the application and the IPC message structure "struct_msg4_v2" is used with version 2 of the application. Once the version compatibility information is associated with the IPC message structures, an application can be configured to use only those IPC message structures that are compatible with the version of the application that is currently running. Using version compatibility information to identify compatible IPC message structures allows for an application on one independent computer system to be upgraded without requiring an upgrade of corresponding applications on the other independent computer systems of the network node.

Figure 5:
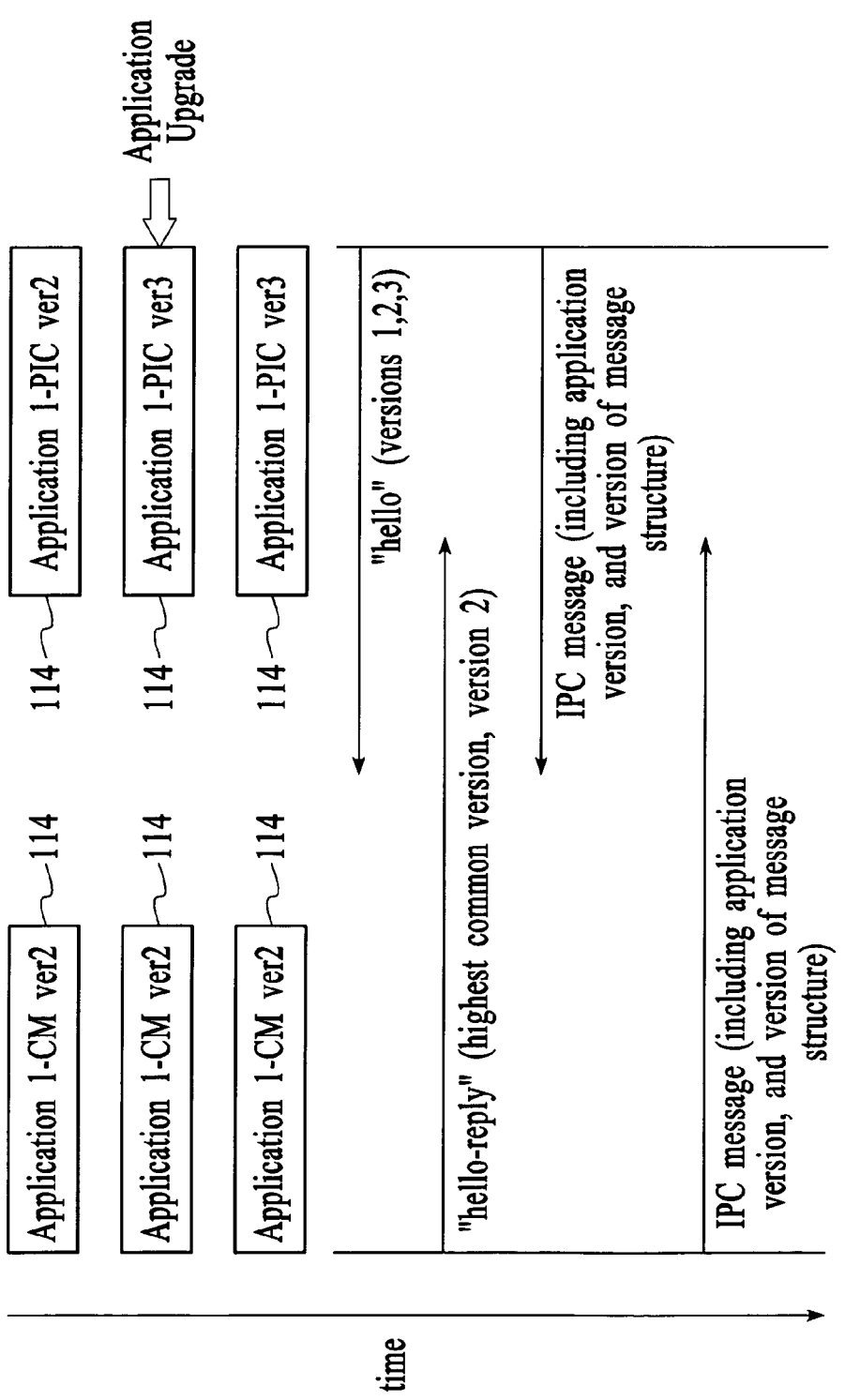
FIG. 5 depicts a timeline of an example of one technique for managing applications in a network node with a distributed architecture using version compatibility information.

The particular details of how version compatibility information is used to manage applications in a network node with a distributed architecture are implementation dependent. An example of one technique for managing applications in a network node with a distributed architecture using version compatibility information is described below. Referring to FIG. 5, at an initial time, two corresponding applications (e.g., application 1-CM and application 1-PIC) are active on their respective independent computer systems and are running version 2. These two applications are assumed to have completely compatible IPC protocols at this time. That is, both of the applications use IPC message structures that are understood by the other applications. At some later time, application 1-PIC is upgraded to version 3. It is assumed that the application upgrade includes changes to the IPC message structures that cause the IPC protocols of application 1-CM and application 1-PIC to have some incompatibilities. At some later time, application 1-PIC initiates a connection to application 1-CM. In accordance with an embodiment of the invention, the initiation of a connection involves a negotiation between the two applications to determine the highest common version of application 1 that is supported by both of the corresponding applications. In the example of FIG. 5, the application that initiated the connection sends a "hello" message identifying the versions that it supports. For example, application 1-PIC sends a hello message indicating that it supports versions 1, 2, and 3 of application 1. Application 1-CM receives the hello message and determines the highest common version of the application that it supports. In the example of FIG. 5, application 1-CM supports up to version 2 of the application and therefore the highest common version of the application is version 2. Application 1-CM sends a "hello-reply" to application 1-PIC that indicates the highest common version to application 1-PIC.

Once the highest common version of the application is determined, IPC messages are provided to the application residing on the control module from the application residing on the port interface C with an indication of the version of the application that is being used and with the version number of each IPC message. The application residing on the control module uses the version number associated with each IPC message to correctly interpret the received IPC message. The process is similar for IPC messages sent from the control module to port interface C.

In an embodiment, the version compatibility information that is used to ensure compatibility of IPC communications is incorporated into a protocol header file. The protocol header file identifies the names and structures of the IPC messages that are to be used for subsequent interprocess communications. The protocol header file is used by an application to configure a database of the respective application to support interprocess communications. In accordance with an embodiment of the invention, the protocol header file includes an identification of the application versions that the IPC protocol supports, the names and structures of the IPC messages that are to be used, and the version compatibility information that is associated with the IPC message structures. In an embodiment of an application that utilizes the "C" programming language, the protocol header file is known as a ".h" file.

FIG. 6 depicts pseudo-code of an example protocol header file 130 (e.g., a C-compliant ".h" file) that includes version compatibility information. Referring to FIG. 6, the versions of the IPC protocol that are supported by this protocol header file are indicated by an initialized "ML_version" structure as a comment within the protocol header file. The versions are formatted as "unsigned short major, unsigned short minor" and the example protocol header file identifies versions 1,0, 2,0, and 3,0.

The comment fields in the protocol header file that indicate the message structure for the IPC messages include the associated version compatibility information. In an embodiment, the associated version compatibility information is included in the comment fields that indicate the message structure. For example, the message identified as "MLm_msg1_msg=1" includes a comment field of "//% MLt_msg1_msg". In the comment field no versions of the application are identified. In this example, identifying no versions of an application indicates that the message structure "MLt_msg1_msg" is compatible with all versions of the application. The message identified as "MLm_msg2_msg=2" includes a comment field of "//% 1-2:MLt_msg2_msg", which indicates that the IPC message structure is compatible with application versions in the range of 1-2. The message identified as "MLm_msg3_msg=3" includes a comment field of "//% 1,3: MLt_msg3_msg", which indicates that the IPC message structure is compatible with application versions 1 and 3. The message identified as "MLm_msg4_msg=4" includes a first comment field of "//% 1,3 MLt_msg4_msg", which indicates that the IPC message structure is compatible with application versions 1 and 3 and a second comment field of "//% 2:MLt_msg4_v2_msg", which indicates that the IPC message structure is compatible with application version 2. The IPC message structure identified in the first comment field is used with versions 1 and 3 of the application and the IPC message structure identified in the second comment field is used with version 2 of the application. Lastly, the message identified as "MLm_msg5_msg=5" includes a comment field of "//% 3:MLt_msg5_msg", which indicates that the IPC message structure is compatible with application version 3. The version compatibility information shown in the pseudo-code of FIG. 6 corresponds to the IPC protocol information that is described with reference to FIG. 4. After protocol header files are processed by the corresponding applications, the corresponding applications are able to communicate with each other via IPC messages that are formatted according to the mutually understood IPC message structures.

Figure 7:
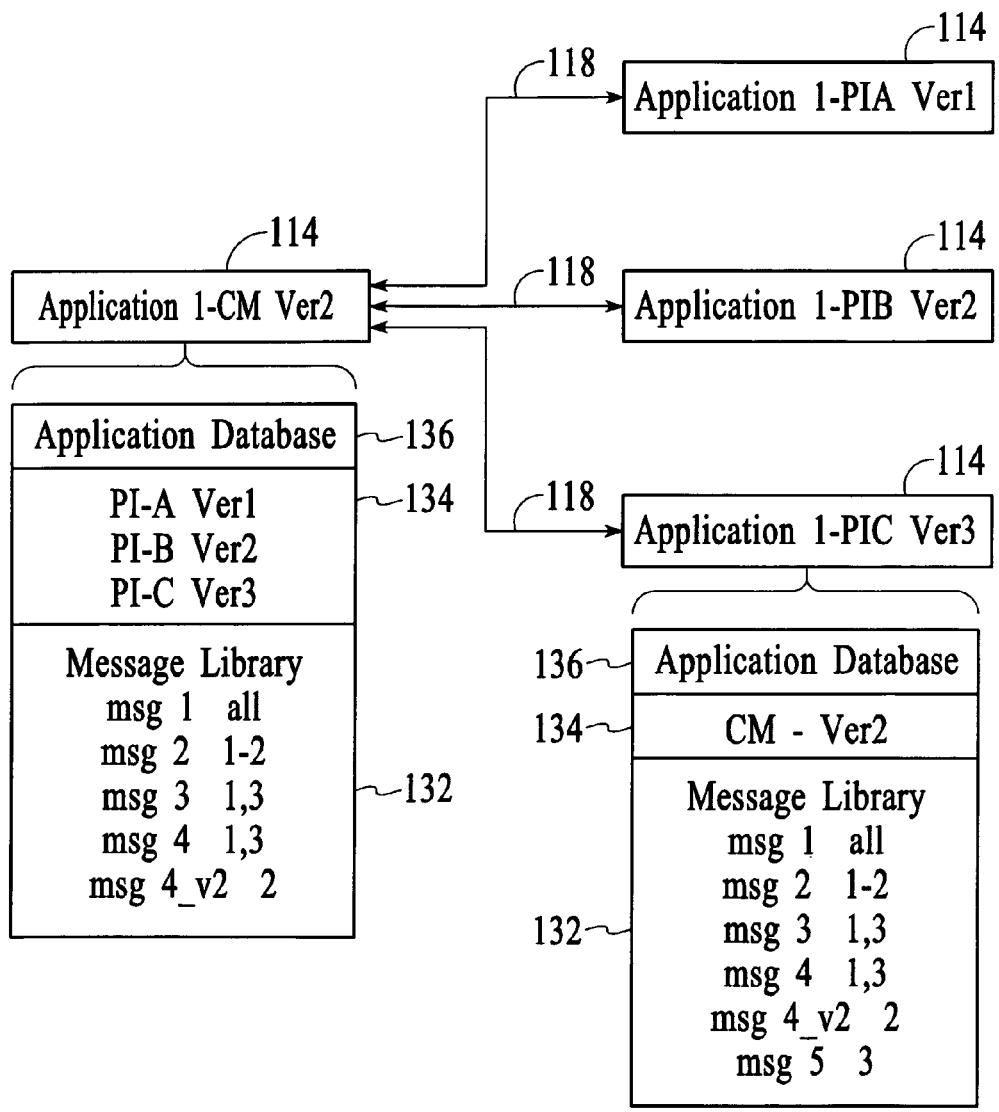
FIG. 7 illustrates different versions of corresponding applications that reside on independent computer systems of a network node with a distributed architecture.

By associating version compatibility information with IPC messages and using the version compatibility information to identify IPC message structures that are used in communications between applications as described above, a network node with a distributed architecture can simultaneously run different versions of corresponding applications on different independent computer systems with full backwards compatibility. FIG. 7 illustrates different versions of corresponding applications 114 that reside on independent computer systems of a network node with a distributed architecture. In the example of FIG. 7, application 1-CM is running version 2 of application 1, application 1-PIA is running version 1 of application 1, application 1-PIB is running version 2 of application 1, and application 1-PIC is running version 3 of application 1. In this example, it is assumed that the applications residing on the port interfaces have negotiated the highest common version of the application with the application residing on the control module and have processed protocol header files that include version compatibility information as described above. As illustrated in FIG. 7 for example purposes, the application that resides on the control module includes a message library 132 with the IPC messages for version 2 of the application and their associated version compatibility information. The application residing on the control module also includes an indication 134 of the versions of the corresponding application that are running on each of the port interfaces. The application that resides on port interface C includes a message library with the IPC messages for version 3 of the application and their associated version compatibility information. The message libraries and the active version information form a part of the application databases 136 that are used by the applications to process IPC messages. The other applications residing on the other port interfaces have similar databases.

Because version information is associated with IPC message structures, the message libraries do not have to be completely replicated each time an application upgrade occurs if the message structures remain the same. Additionally, the version compatibility information that is included in the message library enables an application to support interprocess communications with multiple different applications that are running different versions of the application, thereby providing full backwards compatibility.

In an embodiment, adding a new message to an existing enumerated message list for the latest version of an application can be indicated to an IPC messaging tool of the application by explicitly specifying the <VersionIndexNumber> that points to the new version in ML_version and the corresponding message structure. For example:

MLm_msg_added//%<New VersionIndexNumber>:
        <Message structure name>

In an embodiment, deleting an existing message from the latest version of an application involves specifying a <VersionIndexNumber> that indexes to the older version in the ML_version structure. For example:

MLm_msg_deleted//%<Old VersionIndexNumber>:
        <Message structure name>

In an embodiment, a message existing in multiple versions of an application but with a different message structure is indicated by specifying a comma separated list of <VersionIndexNumber>:<Message structure name> or in a separate comment line. For example:

MLm_msg_changed//%<VersionIndexNumber 1>:<Message structure name 1>, <VersionIndexNumber 2>:<Message structure name 2>
    OR
    MLm_msg_changed//%<VersionIndexNumber 1>:<Message structure name 1>
        //%<VersionIndexNumber 2>:<Message structure name 2>

In an embodiment, if a message and the corresponding message structure remains the same across two versions, this can be indicated by a comma separated list of <VersionIndexNumber>. For example:

MLm_msg_same//%<VersionIndexNumber 1>,<VersionIndexNumber 2>:<Message structure Name>

A range of versions can be specified by a "–". For example:
MLm_msg_range//%<VersionIndexNumber n>–<VersionIndexNumber n+m>:<Message structure Name>

In an embodiment, not associating a <VersionIndexNumber> with a message indicates that this message is supported by all versions of an application that are indicated by the ML_Version structure.

In an embodiment, to support versioning within an application, the message number in the protocol header file cannot be changed and cannot be re-used. To protect against inadvertent message number changes because of changes in the placement of messages in the enumerated structure, all enumerated messages are given an explicit unique number. As long as any of the versions in the protocol support a particular message, the message number corresponding to that message cannot be changed and re-used.

In an embodiment, an application needs to specify the version number to which an IPC message corresponds. The IPC protocol will send this message to only those connections that have the same version or to versions that have the same message type. An application will have to iterate through all versions that it supports, generate the correct message and then send it through the IPC protocol.

In an embodiment, it is assumed that most of the code in an application would operate with the latest version of the IPC protocol. Thus when an application gets a IPC message from an older version of the application, the semantics of that message should be immediately translated to the latest version whenever possible. Similarly an application is responsible for sending messages for all versions that has connections established.

Figure 8:
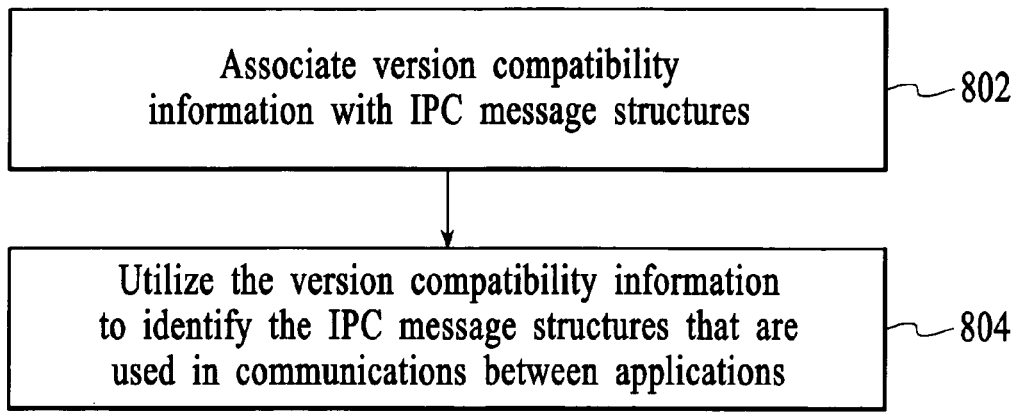
FIG. 8 depicts a process flow diagram of a method for managing applications in a network node that has a distributed architecture in accordance with an embodiment of the invention.

FIG. 8 depicts a process flow diagram of a method for managing applications in a network node that has a distributed architecture in accordance with an embodiment of the invention. At block 802, version compatibility information is associated with IPC message structures. At block 804, the version compatibility information is utilized to identify the IPC message structures that are used in communications between applications.

Figure 9:
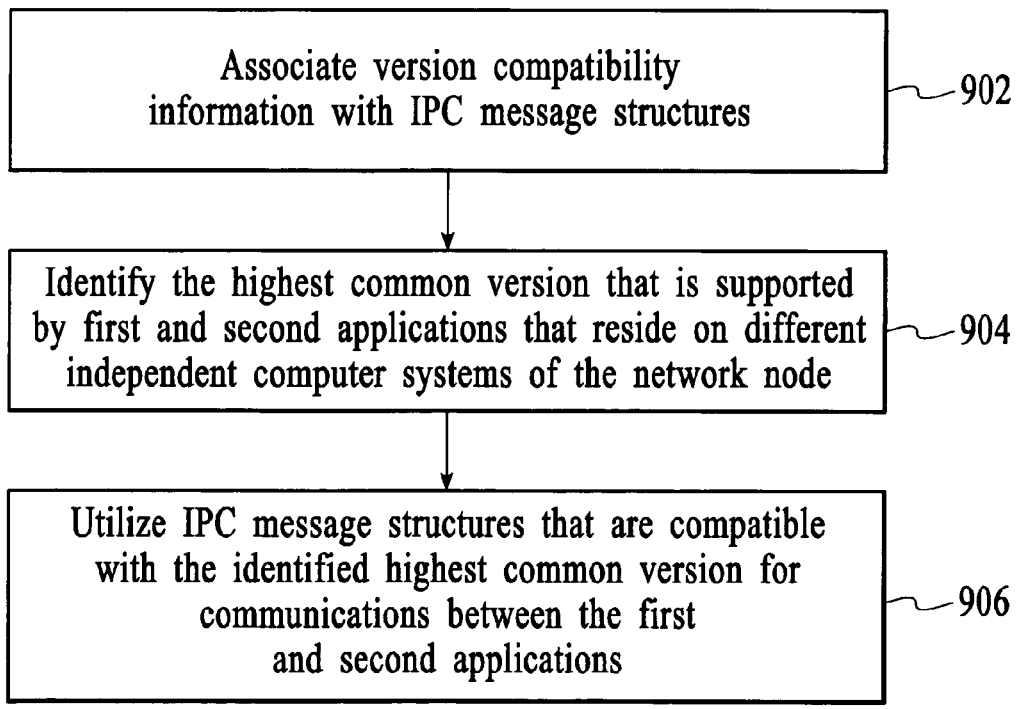
FIG. 9 depicts a process flow diagram of another method for managing applications in a network node that has a distributed architecture in accordance with an embodiment of the invention.

FIG. 9 depicts a process flow diagram of another method for managing applications in a network node that has a distributed architecture in accordance with an embodiment of the invention. At block 902, version compatibility information is associated with IPC message structures. At block 904, the highest common version, which is supported by first and second applications that reside on different independent computer systems of the network node, is identified. At block 906, IPC message structures that are compatible with the identified highest common version are utilized for communications between the first and second applications.

In an embodiment, the above-described techniques for managing applications using version compatibility information are carried out by a software based version manager. As depicted in FIG. 1, the version manager is part of an application. For example, the version manager 122 is embodied as software code that is executed with the support of the corresponding CPU and operating system.

The network node described herein handles traffic in discrete traffic segments. These discrete traffic segments may be, for example, datagrams, packets, frames, or cells and may be fixed-length or variable-length. For purposes of this description, there is no distinction between datagrams, packets, frames, or cells.

Although the independent computer systems of the network node are described as a control module and port interfaces, the independent computer systems are not limited in any way to control modules and port interfaces. As used herein, an independent computer system is defined to mean a computer system that includes a processing unit and an operating system and applications that are supported by the processing unit. In the example of FIG. 1, the control module 102 and the port interfaces 106 are each independent computer systems.

Although specific embodiments of the invention have been described and illustrated, the invention is not to be limited to the specific forms or arrangements of parts as described and illustrated herein. The invention is limited only by the claims.

What is claimed is:

1. A method for managing applications in a network node that has a distributed architecture comprising:
   within a network node comprising:
      a first independent computer system having a processing unit, an operating system, and a first version of an application;
      a second independent computer system having a processing unit, an operating system, and a second version of the application, wherein the first version of the application is different from the second version of the application; and
      a switch fabric that provides data paths between the first and second independent computer systems;
   associating version compatibility information with inter-process communications (IPC) message structures to generate IPC protocol information that includes an association between the version compatibility information and the IPC message structures such that a particular IPC message structure has a corresponding set of different versions of the application with which the particular IPC message structure is compatible; and
   utilizing the IPC protocol information to identify the IPC message structures that are used in communications between the application, wherein the communications are between the first version of the application that resides on the first independent computer system and the second version of the application that resides on the second independent computer system.

2. The method of claim 1 wherein associating version compatibility information with IPC message structures comprises embedding version compatibility information into a message structure identifier field.

3. The method of claim 1 wherein associating version compatibility information with IPC message structures comprises embedding version compatibility information into a comment field that indicates the name of an IPC message structure.

4. The method of claim 1 further including indicating, in a communication from the application that resides on the first independent computer system to the application that resides on the second independent computer system, which version of the application that resides on the first independent computer system is being used.

5. The method of claim 1 further including:
   creating a protocol header file that identifies IPC message structures;
   identifying, in the protocol header file, which versions of an application are supported by the protocol header file; and
   identifying, in the protocol header file, the version compatibility information that is associated with the IPC message structures.

6. The method of claim 5 further including utilizing the protocol header file to configure a message library of an application.

7. The method of claim 1 further including identifying a highest common version that is supported by the application that resides on the first independent computer system and the application that resides on the second independent computer system.

8. A method for managing applications in a network node that has a distributed architecture comprising:
within a network node comprising:
a first independent computer system having a processing unit, an operating system, and a first version of an application;
a second independent computer system having a processing unit, an operating system, and a second version of the application, wherein the first version of the application is different from the second version of the application; and
a switch fabric that provides data paths between the first and second independent computer systems;
associating version compatibility information with interprocess communications (IPC) message structures to generate IPC protocol information that includes an association between the version compatibility information and the IPC message structures such that a particular IPC message structure has a corresponding set of different versions of the application with which the particular IPC message structure is compatible;
identifying a highest common version of the application that is supported by the first version of the application that resides on the first independent computer system and the second version of the application that resides on the second independent computer system; and
utilizing the IPC message structures that are compatible with the identified highest common version of the application for communications between the first version of the application that resides on the first independent computer system and the second version of the application that resides on the second independent computer system.

9. The method of claim 8 wherein utilizing IPC message structures that are compatible with the identified highest common version includes negotiating the highest common version between the application that resides on the first independent computer system and the application that resides on the second independent computer system.

10. The method of claim 8 wherein associating version compatibility information with IPC message structures comprises embedding version compatibility information into a message structure identifier field.

11. The method of claim 8 wherein associating version compatibility information with IPC message structures comprises embedding version compatibility information into a comment field that indicates the name of an IPC message structure.

12. The method of claim 8 further including identifying, in a protocol header file, which versions of the application that resides on the first independent computer system are supported.

13. The method of claim 8 further including utilizing protocol header files that include the version compatibility information to configure a message library of the application that resides on the first independent computer system and the application that resides on the second independent computer system.

14. A network node for a packet-based communications network comprising:

within the network node, a first independent computer system having a processing unit, an operating system, and a first version of an application;
within the network node, a second independent computer system having a processing unit, an operating system, and a second version of the application, wherein the first version of the application is different from the second version of the application; and
within the network node, a switch fabric that provides data paths between the first and second independent computer systems;
wherein the applications of the first and second independent computer systems include version managers that are configured to:
associate version compatibility information with interprocess communications (IPC) message structures to generate IPC protocol information that includes an association between the version compatibility information and the IPC message structures such that a particular IPC message structure has a corresponding set of different versions of the application with which the particular IPC message structure is compatible; and
utilize the IPC protocol information to identify the IPC message structures that are used in communications between the applications of the first and second independent computer systems.

15. The network node of claim 14 wherein the version managers are further configured to embed version compatibility information into a message structure identifier field.

16. The network node of claim 14 wherein at least one of the version managers is further configured to indicate, in a communication from the application of the first independent computer system to the application of the second independent computer system, which version of the application of the first independent computer system is used in the communication.

17. The network node of claim 14 wherein at least one of the version managers is further configured to:
create a protocol header file that identifies IPC message structures;
identify, in the protocol header file, which versions of an application are supported by the protocol header file; and
identify, in the protocol header file, the version compatibility information that is associated with the IPC message structures.

18. The network node of claim 17 wherein the protocol header file is used to configure a message library.

19. The network node of claim 14 wherein the version managers are further configured to identify a highest common version that is supported by the applications of the first and second independent computer systems.

20. A network node for a packet-based communications network comprising:
within the network node, a first independent computer system having a processing unit, an operating system, and a first version of an application;
within the network node, a second independent computer system having a processing unit, an operating system, and a second version of the application, wherein the first version of the application is different from the second version of the application; and
within the network node, a switch fabric that provides data paths between the first and second independent computer systems;

wherein the applications of the first and second independent computer systems include version managers that are configured to:

associate version compatibility information with interprocess communications (IPC) message structures to generate IPC protocol information that includes an association between the version compatibility information and the IPC message structures such that a particular IPC message structure has a corresponding set of different versions of the application with which the particular IPC message structure is compatible;

identify a highest common version of the application that is supported by the first version of the application that resides on the first computer system and the second version of the application that reside on the second computer system; and utilize IPC message structures that are compatible with the identified highest common version of the application for communications between the first version of the application that resides on the first computer system and the second version of the application that resides on the second computer system.

21. The network node of claim 20 wherein the version managers are further configured to negotiate the highest common version between the applications of the first and second independent computer systems.

22. The network node of claim 20 wherein the version managers are further configured to embed version compatibility information into a message structure identifier field.

23. The network node of claim 20 wherein the version managers are further configured to identify, in a protocol header file, which versions of the application are supported by the protocol header file.

24. The network node of claim 23 wherein the protocol header file is used to configure a message library.

* * * * *

UNITED STATES PATENT AND TRADEMARK OFFICE
CERTIFICATE OF CORRECTION

PATENT NO. : 7,653,911 B2  Page 1 of 1
APPLICATION NO. : 10/934679
DATED : January 26, 2010
INVENTOR(S) : Doshi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1263 days.

Signed and Sealed this

Twenty-eighth Day of December, 2010

David J. Kappos
*Director of the United States Patent and Trademark Office*